United States Patent

[11] 3,598,269

[72] Inventor Raleigh A. Carmen
 Concord, Calif.
[21] Appl. No. 749,790
[22] Filed Aug. 2, 1968
[45] Patented Aug. 10, 1971
[73] Assignee Cutter Laboratories, Inc.
 Berkeley, Calif.

[54] LINED GLASS CONTAINER
 4 Claims, 2 Drawing Figs.
[52] U.S. Cl. .................................................. 215/1,
 215/12, 117/97, 117/124
[51] Int. Cl. ............................................. B65d 23/02,
 B65d 23/08
[50] Field of Search .......................................... 215/1, 1.5,
 12; 117/124 F, 126 GN

[56] References Cited
UNITED STATES PATENTS

| | | | |
|---|---|---|---|
| 2,860,801 | 11/1958 | Nielsen | 215/1 (.5) |
| 2,991,896 | 7/1961 | Glover | 215/12 |
| 3,014,607 | 12/1961 | Barnby | 215/12 X |
| 3,178,049 | 4/1965 | Cottet | 215/1 (.5) |
| 3,182,839 | 5/1965 | Hoag | 215/1 (.5) |
| 3,450,254 | 6/1969 | Miles | 215/1 (.5) X |
| 3,398,044 | 8/1968 | Plueddemann | 117/126 (GSN) X |

*Primary Examiner*—Donald F. Norton
*Attorneys*—Owen, Wickersham & Erickson and Bertram Bradley ABSTRACT: Glass containers lined with polyvinyl chloride containing a bonding agent.

PATENTED AUG 10 1971  3,598,269
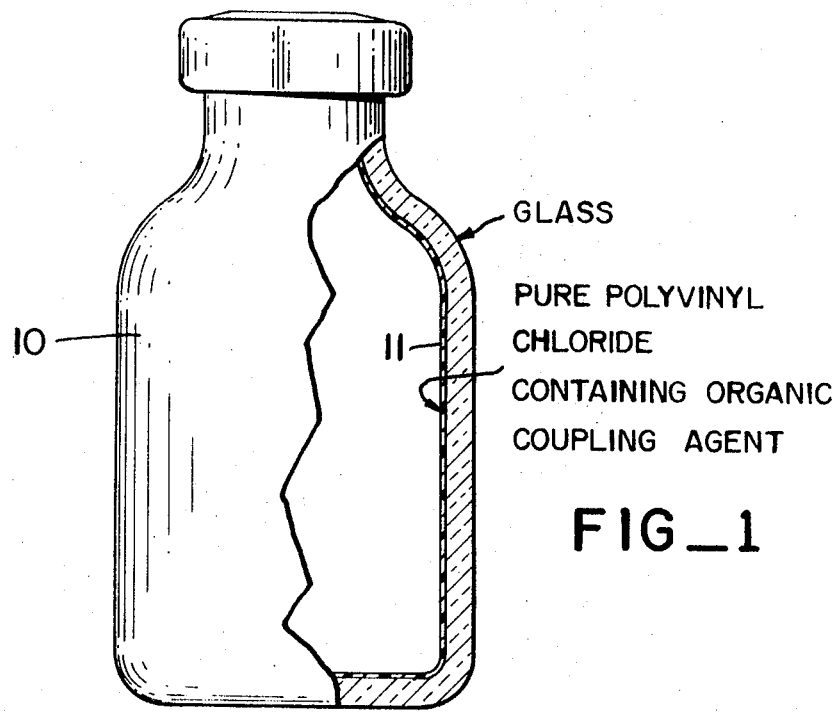
FIG_1
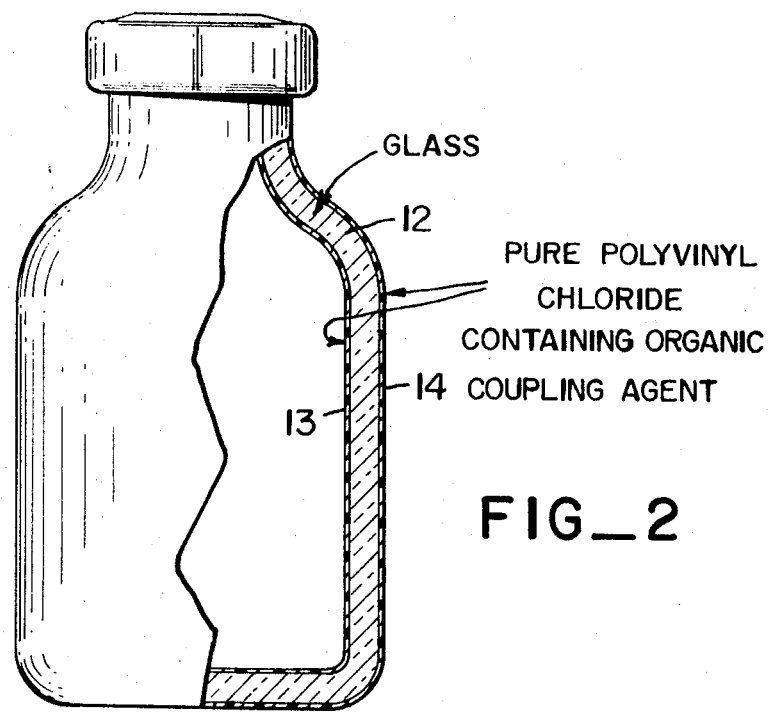
FIG_2
INVENTOR.
RALEIGH A. CARMEN
BY
Owen, Wickersham & Erickson
ATTORNEYS

LINED GLASS CONTAINER

This invention relates to improved containers and more particularly to glass containers lined with a coating of polyvinyl chloride containing a bonding agent. It also relates to a method of so lining glass containers.

The container is especially useful for holding liquids that are active with respect to glass and consequently tend to be defiled by storage in glass. Many liquids and solutions are quite stable in glass of all types and their value is not reduced by prolonged storage in glass. Other liquids or solutions tend to attach glass to an extent that defiles them. This may be due to a combination of alkalinity and corrosive anions in the liquid or solution, and such materials cannot safely be packaged in ordinary glass. Yet a transparent container is often extremely desirable or even necessary.

For example, certain solutions for parenteral use, when stored in ordinary glass containers, attack the glass, largely because of their alkalinity, and become unsafe for parenteral use. As a result, the National Formulary XII recognizes only three types of glass permissible for use in storing parenteral solutions namely Type I glass (a borosilicate glass, which is very expensive), Type III glass, a better than ordinary grade of soda-lime glass, and Type II glass, the same as Type III but specially treated with sulfur dioxide. General-purpose soda-lime glass is not permissible, and Type III is differentiated therefrom by being able to withstand certain minimal tests. But even then, Type II AND Type III glass have been subject to much troubles. Attempts to meet this problem have relied on lowering the pH. This expedient merely reduces the speed at which the glass is attacked and by no means solves the problem. Further alleviation has been obtained sometimes by making the containers from expensive special glass, such as highly resistant borosilicate glass, i.e., Type I glass, but not always with complete success, though always with drastic cost increases. As a result, parenteral solutions have often had to be kept under refrigeration and used within an inconveniently short period. It is, of course, not practical to modify the solution, because modifications that protect the solution during storage tend to reduce its efficacy; also, modification tends to necessitate additional production steps and makes the entire product more expensive. In fact, a general result of the harmful effects by glass bottles upon the broad class of contained liquids that are damaged by storage with glass, has been to shorten shelf life and make the products more expensive to the user.

Another approach to the problem has been to employ containers made from any of a variety of plastic substances which are not subject to attack by alkaline solutions. However, new and often more severe problems have been introduced by the use of such plastic containers. For example, such plastics tend to breathe, so that vapor and moisture is transmitted through them and they tend to become contaminated by gaseous impurities in the air or to be made unsuitable for use because of changes in the concentration of the solution as a result of moisture loss. Moreover, additives such as plasticizers and stabilizers which are employed in plastic materials have often been leached from the plastic by the solutions or liquids stored in the container,—an action which defiles the solutions or liquids just as badly as glass, or even worse.

Other liquids with which the invention gives improved results include cooling oils, vinegar, beer, fruit juices and drinks, wine, and noncarbonated water.

The product of this invention solves the above problems. Substantially any glass from any source can be used with a large number of corrosive liquids and with other liquids defiled by glass, provided the glass is coated or lined according to the principles of this invention. For parenteral solutions, best results are obtained from coating Type II glass or Type I glass (though Type I glass rarely needs the coating). Type III glass can generally give good results but is not as sure to give a good bond as is Type II glass. The coating comprises polyvinyl chloride, preferably in its pure form, bonded to the glass by a suitable organic coupling agent.

The invention makes it possible to employ ordinary glass bottles lined according to the invention for storing such things as intravenous solutions. For example, an ordinary glass bottle to which is satisfactorily bonded an inner lining of pure polyvinyl chloride can be used for storage over an indefinite period of the standard 1.4 percent and 5 percent solutions of sodium bicarbonate, which heretofore have been marketable only when bottled in the special expensive Type I glass and, even then, only when the pH was lowered by carbon dioxide addition, both the Type I and the carbon dioxide addition not only adding to the expense but still not completely solving the problem. Type II glass, which is much less expensive than Type I glass, gives completely reliable results when used with the coating of this invention; Type III glass and ordinary soda-lime glass can be used if carefully inspected, but are not so reliable. Another solution that can be stored in a polyvinyl-chloride-lined glass bottle of this invention is citrated saline, a mixture of sodium citrate and sodium chloride, which has also heretofore been marketable only in the expensive glass, Type I glass, and then with only a two-year shelf life even if kept under refrigeration; if not kept under refrigeration, the shelf life is quite short indeed. The invention can also be used to store such materials as neutral solutions containing lactate, such as the solutions used for the glycerolization and freezing of blood; heretofore such solutions had shown large and rapid rises in pH when standing in glass bottles, indicating that sodium or calcium ions or other alkaline material was being dissolved out from the glass and defiling the solution.

Other objects and advantages of the invention will appear from the following description of some preferred embodiments thereof.

In the drawings:

FIG. 1 is a view in elevation and partly in section of a glass bottle coated according to the principles of the present invention.

FIG. 2 is a similar view of a bottle which is coated both interiorly and exteriorly according to the principles of the present invention.

As shown in FIG. 1, a glass bottle 10 is provided with an inner lining 11 of polyvinyl chloride bonded to the glass. Preferably, the polyvinyl chloride is pure, for it has been found that plasticizers, stabilizers, antioxidants and other additives are liable to introduce contamination, whereas I have found that the pure polyvinyl chloride, even in a very thin coating is unaffected by a wide variety of liquids and solutions and protects the glass from the liquid and the liquid from the glass.

The bonding agent is very important. I prefer to use a suitable organic coupling agent such as gamma-aminopropyl-triethoxysilane [empirical formula $NC_2(CH_2)_3Si(OC_2H_5)_3$], an organofunctional silane sold by Union Carbide as A-1100 silane. (Silane is a general term for compounds containing only one silicon atom, but organofunctional silanes have dual organic-inorganic functionality.) This particular silane reacts with both glass and plastic, forming a chemical bridge between the two. The quantity used is small relative to the polyvinyl chloride and it does not offer a significant source of contamination, as the test results given below show.

FIG. 2 shows a modified form of the invention in which a bottle 12 is coated both inside and outside by an inner lining 13 and an outer coating 14. Exactly the same material may be used as in the bottle of FIG. 1.

Bottles 10 or 12 to be coated may be cleaned by any suitable means and, preferably, are rinsed after cleaning in hot distilled water and then overdried, so that they are presented to the coating solution as clean, dry bottles.

A fairly dilute coating solution may be used, the polyvinyl chloride and the organic coupling agent being dissolved in an organic volatile solvent. For example, a suitable coating solution may be made by dissolving 50 grams of pure polyvinyl chloride resin (Geon 103EPF7 of B. F. Goodrich Co.) in one liter of a suitable organic solvent, such as a 50-50 mixture of cyclohexanone and methyl ethyl ketone. After the polyvinyl chloride has been completely dissolved, 0.05 gram of the coupling agent, such as gamma-aminopropyl-triethoxysilane, is added.

For coating the interior surface only, as in FIG. 1, the clean bottles are preferably filled with the coating solution, and are then inverted and drained. For coating both the inside and outside, as in FIG. 2, the bottles may be dipped and drained. In either event, most of the solvent may then be removed by oven heating at about 60° C. for about 1 hour. Final solvent removal and curing may be done by heating the bottle in an oven at about 100° C. for about 15 minutes. Preferably, the coated containers are retained at room temperature for about two days before being used, that is, before being filled with a suitable solution, to assure complete cure of the coating. From this process, a coating thickness of about 0.2 mil results, and it has been found that an average of about 200 milligrams of plastic are deposited in a one-quarter liter bottle and about 400 milligrams of plastic are needed to line a one-liter bottle. Thus, an interior lining of only about 0.4 to 0.8 part serves to retain about 1,000 parts of the liquid or solution to be placed in the bottle.

When pure polyvinyl chloride resin is used, adding only the coupling agent and that in an a mount of only about 1 part per 1,000 of the resin, no plasticizers, stabilizers, antioxidants or other additives being used, the extractables are limited to hydrogen chloride and possibly to some low molecular weight polymer formed by degradation during aging. Neither of these are present in any significant amount, according to tests that have been run. The coupling agent is of very low toxicity and it apparently reacts completely with the resin and the glass, and since the maximum amount in the solution is less than 1 part per million anyway, it is hardly a source of risk.

The effectiveness of this invention has been tested by filling 250-milliliter Type II glass bottles, some lined according to the invention and others unlined control glass bottles of the same type were filled with solutions of several chemical substances indicated below. The bottles were then sealed with screw caps, autoclaved, and stored. Some of each type were stored at 40° C. for extended periods of time, as shown in the tables below. At specified intervals the solutions were analyzed for soluble silicate content and for pH, both a measure of glass attack. They were also analyzed for other things, and the results are shown in the tables below, each data point being the average of several samples.

TABLE I

GLASS ATTACK

| Solution | Type II Bottle | Storage at Room Temperature | | Storage at 40° C. | |
|---|---|---|---|---|---|
| | | pH[1] | Soluble Silica, p.p.m. | pH | Soluble Silica, p.p.m. |
| 1.4% NaHCO₃, | lined | | | | |
| 1 month | | —[2] | — | 8.55 | 0.2 |
| 3 months | | 8.61 | 0.1 | 8.62 | 0.3 |
| 6 months | | 8.73 | 0.3 | 8.50 | 1.1 |
| 12 months | | —[2] | — | 8.39 | 0.5 |
| 24 months | | 8.55 | 1.9 | — | — |
| 1.4% NaHCO₃, | unlined | | | | |
| 1 month | | — | — | 8.56 | 3.3 |
| 3 months | | 8.69 | 16.5 | 8.87 | 85.5 |
| 6 months | | 8.63 | 24.9 | —[4] | —[4] |
| 24 months | | 9.16 | 38.4[5] | — | — |
| 5% NaHCO₃, | lined | | | | |
| 3 months | | 8.32 | 0.6 | 8.29 | 1.3 |
| 6 months | | 8.10 | 1.0 | 8.11 | 2.1 |
| 5% NaHCO₃, | unlined | | | | |
| 3 months | | 8.32 | 12.6 | 8.32 | 132.0[5] |

Table I—Continued

| | | | | |
|---|---|---|---|---|
| 6 months | 8.10 | 44.3[3,4] | —[4] | —[4] |
| 0.35% Sodium lactate +0.03% KCl +0.04%MgCl₂·6H₂O, lined | | | | |
| 1 month | — | — | 7.34 | — |
| 3 months | 7.16 | — | 7.18 | — |
| 6 months | 7.16 | — | 7.11 | — |
| 12 months | — | — | 7.11 | 3.8 |
| 24 months | 7.04 | 2.0 | — | — |
| 0.35% Sodium lactate +0.03% KCl +0.04%MgCl₂·6H₂O, unlined | | | | |
| 1 month | — | — | 7.59 | — |
| 3 months | 7.33 | — | 9.22 | — |
| 6 months | 8.80 | — | —[4] | —[4] |
| 24 months | 9.32 | 14.0[5] | — | — |
| 0.63% Sodium Citrate, 0.7% NaCl, lined | | | | |
| 1 month | — | — | 7.10 | 0.1 |
| 3 months | 7.07 | 0.3 | 7.02 | 0.5 |
| 6 months | 7.09 | 0.2 | 7.09 | 1.7 |
| 12 months | — | — | 7.10 | 2.4 |
| 24 months | 7.07 | 1.8 | — | — |
| 0.63% Sodium Citrate, 0.7% NaCl, unlined | | | | |
| 1 month | — | — | 7.15 | 3.0 |
| 3 months | 7.10 | 3.2 | 7.12 | 8.1 |
| 6 months | 7.09 | 3.7 | —[4] | [4] |
| 24 months | 7.15 | 10.0 | — | — |

(1)

Prior-to-fill values: NaHCO₃ solution 8.22,

Sodium lactate solution 7.27, citrated saline solution 7.10.

(2)

No analysis: glass attack rarely evident after only 1 month at R.T.

(3)

No analysis: samples to be held in reserve.

(4)

Controls were not carried beyond 3 months at 40° C. due to severe degradation.

(5)

Precipitate was present in gross amounts but was not analyzed or measured.

(6)

Glass badly etched.

The above data show that: 1 the polyvinyl chloride lining of this invention virtually eliminates the severe glass attack typical of bicarbonate solutions; (2) the lining protects a glass substrate from attack by citrate solution; and (3) lactate solutions are pH stable in lined containers.

Stability

The coating material, as said earlier, amounts to 0.4 to 0.8 parts per 1,000 parts of the solution to be stored in the bottle. Since this coating is pure polyvinyl chloride resin, without plasticizers, stabilizers, antioxidants or like additives, the extractable material is confined to HCl and possibly low molecular weight polymer formed by degradation during aging; furthermore, tests showed that little or no HCl and very little, if any, degraded polymer could be extracted.

Degradation and extractables were measured via accelerated physicochemical tests and analysis of 40° C. stability samples.

In the physicochemical tests, extraction was done at 121° C. for 6 hours. The rate of coating surface area per solution volume was about four times that for a coated ⅛-liter bottle of this invention. The results are shown in the following table. For this table, the solution in Type II glass bottles level according to this invention were compared with controls that were in Type I glass bottles, which have been recognized as giving fully satisfactory results in these tests.

TABLE II

Physicochemical Tests

| Test | Extract | Results |
|---|---|---|
| Tyndal light examination | NaHCO₃ (as in Table I)<br>Sodium lactate (as in Table I)<br>Citrated saline (as in Table I)<br>Water for intravenous injection | All four extracts were equal to or better than were the controls. |
| pH change | NaHCO₃<br>Sodium lactate<br>Citrated saline<br>Water for injection | $\Delta pH=0.48$; Control=0.45.<br>$\Delta pH=-0.37$; Control=0.20.<br>$\Delta pH=-0.03$; Control=0.57.<br>$\Delta pH=-2.20$; Control=0.70. |
| Heavy metals | NaHCO₃<br>Sodium lactate<br>Citrated saline<br>Water for injection | All samples and controls <1 p.p.m. |
| Chloride | NaHCO₃<br>Sodium lactate<br>Citrated saline<br>Water for injection | 0.12 p.p.m. HCl from coating.<br>0.07 p.p.m. HCl from coating.<br>0.43 p.p.m. HCl from coating.<br>0.10 p.p.m. HCl from coating. |
| Polyvinyl chloride | NaHCO₃<br>Sodium lactate<br>Citrated saline<br>Water for injection | 1 part PVC/15×10⁶ parts solution.<br>½ part PVC/15×10⁶ parts solution.<br>1 part PVC/15×10⁶ parts solution.<br>None. |
| Total residue | Water for injection | <0.1 mg./100 ml. |

One hundred fifty milliliters of each of the above extracts (excluding the water for intravenous injection) were passed through a cellulose membrane, 0.45 μpore size. All were clean to the naked eye. Examination under a 40-power microscope showed a fair number of extraneous particles, but extraction samples taken from solutions stored in polyvinyl-chloride-lined bottles of Type II glass, according to this invention, were equal to or better than the controls stored in Type I glass bottles. Each membrane was washed with 25 ml. of hot methyl ethyl ketone. After concentrating to 0.1 ml., thin-layer chromatography was used to look for polyvinyl chloride. Resin equivalent to about 1 part in 15 million was found for the NaHCO₃ solution and sodium citrate-sodium chloride solution about one half as much for the sodium lactate solution.

The filtrates from the above samples were also tested for organics, and a very minute quantity was present in the NaHCO₃ and citrated saline extracts. This also appeared to be high molecular weight material, but it was much less than that found on the membranes.

Extracts from the water for intravenous injection were simply evaporated down, and the weighed residues washed in hot methyl ethyl ketone and tested as above. Residue from the lined vials was less than 0.1 mg./100 ml. No polyvinyl chloride was detected.

The results of these tests are favorable to the coating. Resin degradation is almost negligible, and the extracting media are not adversely affected by contact with the coating. The drop in pH of the lactate is normal for this solution in an inert container.

TABLE III

TESTS ON SAMPLES AGED AT 40° C.

| Test | Solution and Time of Storage in lined bottles of this invention | Results |
|---|---|---|
| Chloride | NaHCO₃, 6 months | 0.45 p.p.m. HCl from coating |
| | NaHCO₃, 12 months | 1.18 p.p.m. HCl from coating |

Table III – Continued

| | | |
|---|---|---|
| Polyvinyl chloride | NaHCO₃, 6 months<br>Sodium lactate, 6 months<br>Citrated saline, 6 months | All three solutions contained much less than one part PVC in 15×10⁶ parts solution |

Thin-layer chromatography was used in the polyvinyl chloride assays reported above. In addition, infrared spectrum tests of the citrated saline residue showed absolutely no sign of the C-Cl band nor the -CH band (in -CHCl-), which are characteristic of polyvinyl chloride.

The best indication of degradation is HCl liberation. The 1.18 p.p.m. HCl found in NaHCO₃ solutions stored for a full year in lined bottles of this invention represents 0.15 weight percent of the coating. This corresponds to the formation of only one double bond in every 390 repeating units of the polymer chain, and indicates an extremely low degree of degradation.

Another measure of aging characteristics of the coating was made by comparing HCl liberation of fresh coatings with aged coatings. Samples aged at 40° C. were emptied, and the lined bottles were refilled with water suitable for intravenous injection and autoclaved at 121° C. for 6 hours. Hydrogen chloride concentrations in the water were:

TABLE IV

AGING TESTS

| Coating | HCl, p.p.m. |
|---|---|
| Fresh | 0.10 |
| Aged 6 months with NaHCO₃ solution | 0.08 |
| Aged 12 months with NaHCO₃ solution | 0.23 |
| Aged 6 months with citrated saline solution | 0.18 |
| Aged 12 months with citrated saline solution | 0.18 |
| Aged 12 months with sodium lactate solution | 0.33 |

The coatings apparently are not weakened by long term aging. (As throughout this specification, except where stated otherwise, the solutions are those given in table I, the 1.4 percent bicarbonate solution being the one used except where otherwise stated.)

The appearance of the coating is also unaffected by aging. In all cases, the lined bottles resemble unlined controls except for a misty appearance and subsequent lack of sparkle above the solution line.

Safety was studied, and LD₅₀ values for water for intravenous injection, normal saline, and polysal solutions aged in lined Type II glass containers at 50° C. were compared to values for solutions aged in unlined Type I glass containers. Results to date are summarized in this table.

TABLE V
Safety of solution stored in lined glass bottles of this invention and in unlined glass bottles

| Solution | Storage Time | $LD_{50}$, cc./kg. | |
|---|---|---|---|
| | | Lined Type II | Unlined Type I |
| Polyelectrolyte solutions | 1 month | 315±25 | 288 ±23 |
| | 3 months | 313±30 | 330 ±27 |
| | 12 months | 290±21 | 310 ±21 |
| Saline (NaCl 0.9%) | 1 month | 233±20 | 265 ± 9 |
| | 3 months | 240±24 | 250 ± 17 |
| | 12 months | 255±17 | 255 ±17 |
| Water for Injection | 1 month | 51± 5.6 | 55 ± 2.9 |
| | 3 months | 52± 4 | 59 ± 3 |
| | 12 months | 55± 5 | 55 ± 5 |

*Polyelectrolyte solution was: (1) NaCl 0.496%; (2) KCl 0.075%; (3) $CaCl_2 \cdot 2H_2O$ 0.037%; (4) $MgCl_2 \cdot 2H_2O$ 0.03%; (5) NaAcetate·$3H_2O$, 0.740%.

$LD_{50}$ values for solutions aged in PVC-lined containers do not differ significantly from those found for solutions aged in glass.

Coating may be done by diverting the polyvinyl chloride solution from a circulating loop into each of a series of inverted bottles. Each bottle is drained over a trough and moved by conveyor under a radiant heater where most of the solvent is removed. Bottles are then placed on carts and cured in a batch oven. The process can easily accommodate the coating of 600 bottles per hour.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A glass bottle having an interior lining consisting essentially of pure polyvinyl chloride containing gamma-aminopropyl-triethoxysilane as a bonding agent.

2. The bottle of claim 1 wherein the bonding agent is present in amounts of one part to each thousand parts of polyvinyl chloride.

3. The bottle of claim 1 wherein the glass is Type II parenteral glass.

4. The bottle of claim 1 wherein the glass is soda-lime glass that has been treated with sulfur dioxide.

PO-1050
(5/69)

UNITED STATES PATENT OFFICE
CERTIFICATE OF CORRECTION

Patent No. 3,598,269  Dated August 10, 1971

Inventor(s) Raleigh A. Carmen

It is certified that error appears in the above-identified patent and that said Letters Patent are hereby corrected as shown below:

Col. 1, line 28, "AND" should read -- and --; line 63, "cooling" should read -- cooking --. Col. 3, line 20, "a mount" should read -- amount --; line 35, between "stored" and "at" should be inserted -- at room temperature and others of both types were stored --. Col 4, line 34 "(4)" should read -- --(4) --; line 64, "1" should read -- (1) --. Col. 5, line 8, "1/8-liter" should read -- 1/2-liter --; line 10, "solution" should read -- solutions --; line 36, "µpore" should read -- µ pore --. Col. 7, line 10, "solutions" should read -- solutions* --.

Signed and sealed this 9th day of May 1972.

(SEAL)
Attest:

EDWARD M. FLETCHER, JR.
Attesting Officer

ROBERT GOTTSCHALK
Commissioner of Patents